United States Patent [19]

Larsen et al.

[11] Patent Number: 6,088,700
[45] Date of Patent: Jul. 11, 2000

[54] AUTOMATED FORMS COMPLETION FOR GLOBAL INFORMATION NETWORK APPLICATIONS

[76] Inventors: Kenneth N. Larsen, 5617 Palmetto Rd., New Port Richey, Fla. 34652; Eric Peterson, 5035 Fox La., Alpharetta, Ga. 30004

[21] Appl. No.: 09/369,551

[22] Filed: Aug. 6, 1999

[51] Int. Cl.$^7$ .................................................. G06F 17/30
[52] U.S. Cl. ........................... 707/10; 707/505; 707/506; 707/507
[58] Field of Search ........................... 707/10, 505, 506, 707/507

[56] References Cited

U.S. PATENT DOCUMENTS

| | | | |
|---|---|---|---|
| 4,553,206 | 11/1985 | Amutek et al. | 707/3 |
| 4,763,356 | 8/1988 | Day, Jr. et al. | 379/368 |
| 4,829,294 | 5/1989 | Iwami et al. | 340/723 |
| 4,962,475 | 10/1990 | Hernandez et al. | 364/900 |
| 5,251,291 | 10/1993 | Malcolm | 395/146 |
| 5,640,577 | 6/1997 | Scharmer | 395/768 |

*Primary Examiner*—Thomas G. Black
*Assistant Examiner*—Frantz Coby
*Attorney, Agent, or Firm*—Dennis L. Cook

[57] ABSTRACT

A global information network forms completion data processing system uses data stored in a database to automatically fill out data fields of the various and multiple forms displayed on the WEB browsers of users who are engaged in commerce, dealing with governmental agencies, or otherwise attempting to complete transactions over the global information network. The data processing system retrieves tagged information previously entered and stored in a database, and automatically inserts the data in similarly tagged uncompleted fields of any number and variety of forms. The fully completed forms are then transmitted to the parties requesting the information and are stored for later retrieval, updating and printing by the user.

7 Claims, 3 Drawing Sheets

AUTOMATED FORMS COMPLETION FOR GLOBAL INFORMATION NETWORK APPLICATIONS

FIELD OF THE INVENTION

The present invention is an improvement in the field of data processing over the global information network and more specifically it is a data processing system for automatically completing forms displayed on users web browsers.

BACKGROUND OF THE INVENTION

Many users of the global information network are often required to fill out multiple and varied forms to do business with a variety of companies doing electronic commerce, or contact companies or regulatory agencies for a variety of reasons. For example, a user applying for a credit card may have to complete a form with the same information he or she just filled in on a different form used to order some goods or services from a different company. Those users applying for jobs and completing application papers or security clearance papers may find themselves completing various forms over and over again using the same information, but having to reenter it because the format of the forms are different.

Electronic commerce over the global information network relies heavily on forms and in some cases, up to several dozen forms may have to be filled out. Such forms may include initial customer set up checklists, customer credit forms, and follow-up forms, and even return e-mails to be sent back to the customer. Regulatory agencies also rely heavily on many different forms for applications or information gathering.

Historically such forms were typically filled out manually and placed in a file folder. Little information was available on-line or in a data processing system. All follow-up action on a particular case required access to this file. Locating the file was often a problem leading to time lost and wasted in searching for the file. Additionally, a manual file system also resulted in incomplete files due to forms not being placed in the file, or forms improperly or incompletely filled out.

More recent prior art systems are focused mainly on internal systems. U.S. Pat. No. 5,640,577 discloses a data processing system including automated forms generation that uses data displayed at a predetermined position on a data terminal display screen, and a data processing function selector, to automatically retrieve a pre-established form stored in a data processing system. In one embodiment, the form includes a number of uncompleted fields. The data processing system retrieves at least one datum from at least one data field displayed on the screen, and automatically inserts the data in a predetermined uncompleted field of the form. The partially or fully completed form is then stored for later retrieval, updating and printing by the data processing system.

These types of systems are now common on intranet based processing within companies, but they are complicated systems generally requiring personnel with significant technical expertise to install, create the forms, and set up the mapping of the information to the forms. Also, a customer or applicant first approaching the company with his or her personal information must start by completing the companies set of forms. The process must be repeated over and over again each time that the person goes to a new company. Such a method is extremely time consuming, further ties up the host computer resources, and often results in numerous data entry errors. This further results in delays in processing the customer cases and an accompanying tendency to act on incomplete or improperly compiled information.

It is therefore the object of this invention to supply multiple users of the global information network with a convenient method of automatically completing multiple forms for multiple companies or regulatory agencies, by filing out the information once on any form presented on the user's web browser. It is also an object of this invention to allow the user the opportunity to update their individual information automatically when they are completing a new form on their web browser. It is a further object of this invention to allow multiple companies or regulatory agencies who do electronic commerce or other applications over the global information network a simple method that can be implemented by non technical staff to transfer their forms to automatically filling electronic forms. And also to offer multiple users a convenient way of entering information into all the data fields on their many forms automatically.

SUMMARY OF THE INVENTION

The present invention has been made to solve the problems described above. It is a global information network forms completion data processing system that uses data stored in a database to automatically fill out data fields of the various and multiple forms displayed on the web browsers of multiple users who are engaged in commerce with companies, dealing with governmental agencies, or otherwise attempting to complete transactions over the global information network. Once a company, or regulatory agency using this system registers its forms the data processing system retrieves tagged information previously entered by the user and stored in a database, and automatically inserts the data in similarly tagged uncompleted fields of any number and variety of registered forms. The fully completed forms are then transmitted to the parties requesting the information and are also stored for later retrieval, updating and printing by the user.

BRIEF DESCRIPTION OF THE DRAWINGS

Other objects, features and advantages of the present invention will become apparent from the detailed description of the invention that follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

In the preferred embodiment the data processing system is a tool designed to eliminate incomplete and incorrect information associated with filling out forms by potential candidates or employees of a company. Of course those skilled in the art will recognize this system can be used by a variety of entities using forms to collect information for any number of reasons. A form is any document that requests specific information from one party for the purpose of communicating with another party. The preferred embodiment provides an electronic method of capturing that information, replacing the traditional paper form. The tool validates that all required information has been entered and that fields that require a specific format are correct.

The tool consists of two separate modules. The first module is the Mapping Application, used to identify the forms, their fields, and the clients subscribing to each form, and then map that information into a relational database. The relational database used in the preferred embodiment is Sybase, Inc.'s Adaptive Server Enterprise database. The second module is the Web Form Filler that uses a web server that allows potential candidates or employees of a company to fill out the forms electronically. The server used in the preferred embodiment is Sybase, Inc.'s Jaguar Component Transaction Server.

Figure 1:
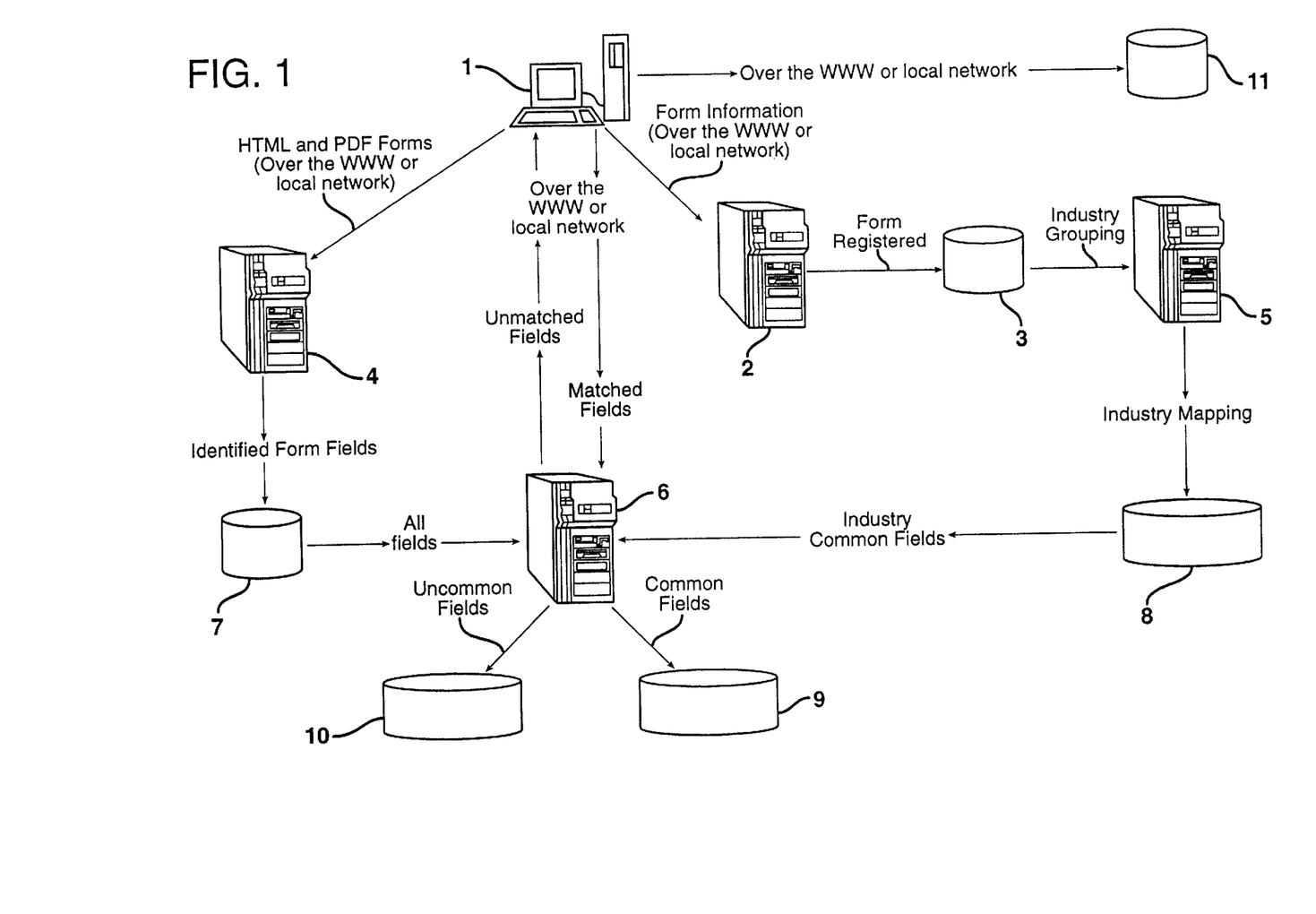
FIG. 1 is a flow diagram of the forms mapping data flow.

Referring now to FIG. 1 a reader skilled in the art can follow the flow of information in the Mapping Application as a company registers its forms in the system. An External Entity (1), the company, submits form information to the Mapping Application over the Global Information Network or Local Network to the Form Registrar (2) a computer processor. The Form Registrar (2) gives the form a unique identifier and submits that information to the Form Database (3). The External Entity (1) also submits an HTML or a scanned PDF version of the form that is also given the unique identifier and is stored in the Form Database (3). The form template is also sent to the Form Field Identifier (4) that is also a computer processor. The Form Field Identifier (4) parces out and identifies each data field on the submitted form and sends that information to the Form Fields (7) database. Meanwhile the Common Industry Mapper (5), another computer processor, pulls information about the industry group associated with the form being registered from the Form Database (3) and maps that information to the Industry Common Fields (8) database.

Next a Form Field Matcher (6) pulls information regarding all the data fields from the Form Fields (7) database and common industry fields from the Industry Common Fields (8) database and sends information in the form of unmatched fields back to the External Entity (1) to compare with common fields. The External Entity (1) verifies common fields and submits the information back to the Form Field Matcher (6) as matched fields. After verification The Form Field Matcher then sorts the common fields (those that were matched) from the uncommon fields (those left unmatched), sending the common fields to the Identified Common Form Fields (9) database, and the uncommon fields to the Identified Unique Form Fields (10) database for storage and retrieval when needed later by a user filling out the registered form. The External Entity (1) can then process the information regarding registration of its form and store the information for later retrieval in its Data Store (11). This same process is then repeated by the External Entity (1) for the rest of the forms that it wishes to register.

Figure 2:
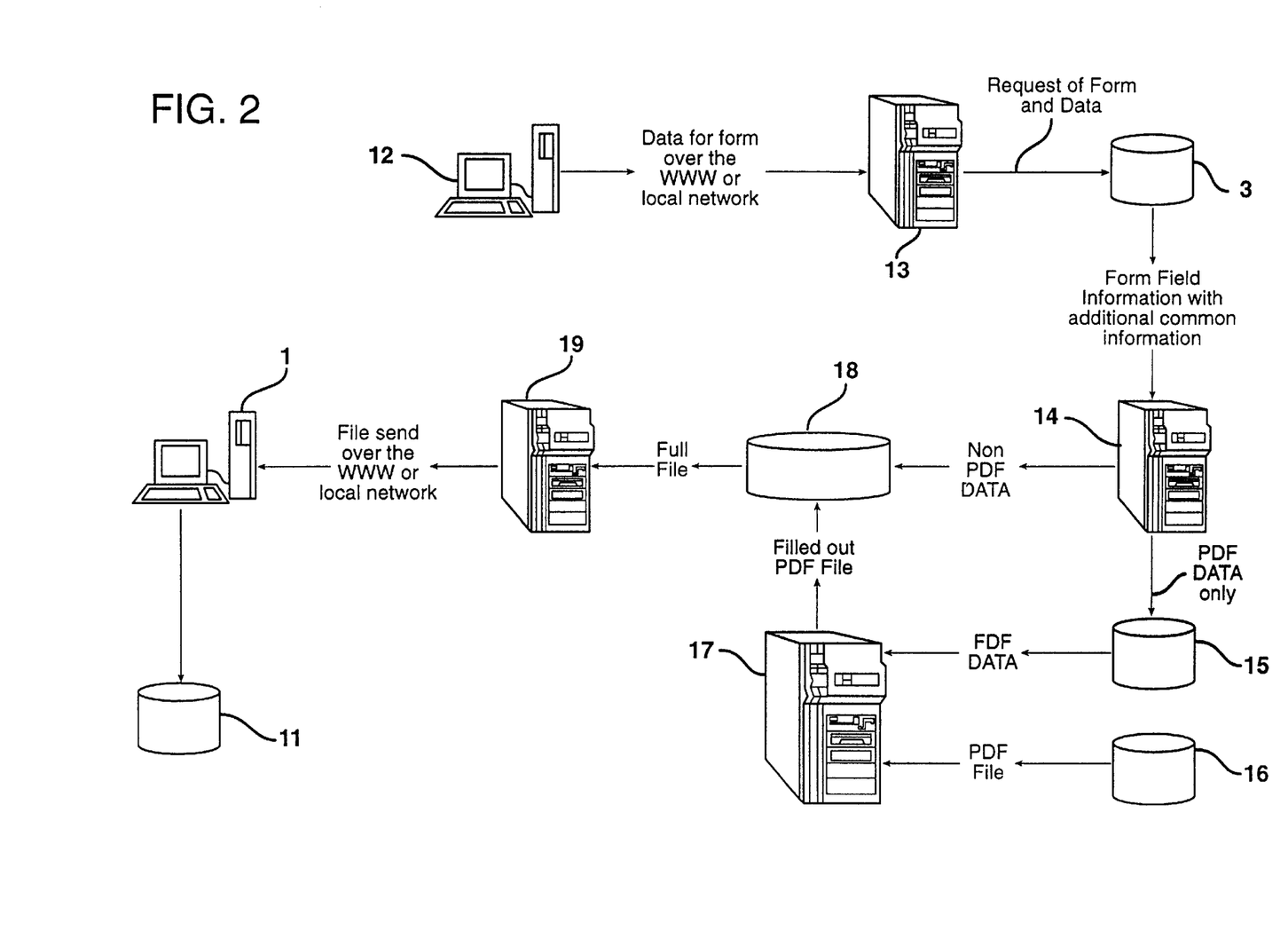
FIG. 2 is a diagram of the usage data flow.

Referring now to FIG. 2 one skilled in the art can follow the flow of information in the data processing system when being accessed by a user to fill out a form. A Web User (12), company candidate or employee, requests a form over the Global Information Network or a Local Network and enters information on his or her display. The information is then transferred over the network to the Form Parcer (13), which is a network server. The Form Parcer (13) submits the request for the form and inputted data to the Form Database (3). The Form Database (3), a relational database further described below, supplies form field information with additional common information to the Form Builder (14). The Form Builder (14) is a computer processor that gathers all the previously stored data associated with the user's request from the relational database and separates PDF data from Non PDF data The Non PDF data is stored in a copy of the completed form at the Completed Form (18) storage. The rest of the data, which is all PDF data, makes up the FDF File (15), and is sent to the PDF Merger (7).

The PDF Merger (7), a computer that uses PDF Merge by Digital Apps, Adobe PDF fill software, or other PDF merge software well known to those skilled in the art, completes the form by merging the FDF File (15) with an Empty Adobe PDF File (16), which is the stored form template that was previously identified with the form being filed out. The filled out PDF file is then stored in the Completed Form (18) storage where it can be viewed at a later time. The full file consisting of the completed PDF form and the Non PDF data is also sent to the Form Send (19) server.

The Form Send (19) server sends the file back over the network to an External Entity (1) that has need of the information submitted by the Web User (10). The External Entity (1) processes the information and stores the information for later retrieval in its Data Store (11).

As mentioned above this system operates with a relational database application. There are six main components within the relational database application. They are Industries, Common Tags, Form, Form Tags, Packages, and Clients. The following section describes each of the components.

An Industry is an area of business that satisfies a particular need or service. For the purpose of the preferred embodiment, an Industry is an area of business that requires specific information unique to that industry. An Industry may also require information common to all industries such as the applicant's name, social security number and address.

A Common Tag is any single piece of information that may be requested for a particular industry. Common Tags identify information that may appear on more than one form, such as applicant's first name, but will only be stored once. If the applicant edits the field on one form, information is changed for all form's fields the Common Tag is associated with.

A Form within the preferred embodiment is the abstract representation of a paper form in the physical world. It is a collection of questions an individual must answer. Examples of forms are an employment application, a W2, and a benefits enrollment form. A Form may consist of form fields and other Forms. An example of a Form contained within a Form may be an employment application, which will contain the previous employment form. The previous employment form may be filled out several times for an individual depending on the number of previous employment's they have had. In the preferred embodiment the Form is stored as an Adobe Acrobat PDF document and are filled in using PDF Merge software by Digital Apps, or other merging software well know by those skilled in the art.

A Form Tag is any single piece of information that will be requested of the web user when they select its related form. Each tag created on the form's Adobe Acrobat document is related to one Form Tag. A Form Tag however may be a single piece of information or a concatenation of any number of Form Tags. An example of a concatenated Form Tag may be a telephone number where the telephone number is made up of the area code and the telephone number. The web user would be requested to fill in their area code and telephone number in two separate fields. The Adobe Acrobat form would contain only a single tag for telephone number, consisting of the concatenation of the two fields.

A Package is a collection of related Forms. A Package must have at least one Form. A Form can belong to any number of different Packages. A Client can subscribe to one or more Packages. Any number of Clients can subscribe to a Package. This allows Forms and Packages to be set up only once but used by multiple Clients.

A Client represents the company an individual is applying to or is currently employed with. Client information is not maintained within the database application, only the relationship between Clients and Packages.

These components make up the relational database where the information is stored for use by the Mapping Application and the Web Form Filler. Below is a list of the Tables in the relational database, and the relationships between them. The database software creates each form specific table. The workings of the following listings will be obvious when read by someone skilled in the art of relational database theory and design. In these Tables the following definitions apply:

Column List: A list of database table fields that information is stored in.

Index List: An index provides faster access to the data. This is the list of indexes per table Reference to List: Defines pointers to another table by key identifier.

Reference by List: Tables that have a pointer to this table's unique key identifier.

Name: Name of column.

Code: An internal identifier used by the database software.

Type: The type of data, i.e. numeric, character, etc., and length of data.

Primary Key: The unique identifier for each row of table's data.

Foreign Key: Used to identify the primary key of the reference to table.

Index Code: An internal identifier used by the database software.

Column Code: An internal identifier used by the database software.

P: Primary key for this column.

M: Mandatory, defines if the column must be defined "yes" or can contain null (unknown) values.

F: Foreign Key on this column.

A: Alternate key, another way to identify the data.

U: Unique, all values stored in this column must be unique within the entire table.

C: Cluster, the physical order that the data in a table is stored. In this case it is sorted (clustered) in the same order as the index.

Table applicant

Column List

| Name | Code | Type | P | M |
|---|---|---|---|---|
| applicant_id | applicant_id | int | Yes | Yes |
| client_id | client_id | int | No | No |
| from_EBQ | from_EBQ | char(10) | No | Yes |

Reference to List

| Primary Key | Reference to | Foreign Key |
|---|---|---|
| client_id | client | client_id |

Reference by List

| Referenced by | Primary Key | Foreign Key |
|---|---|---|
| industry_data_example2 | applicant_id | applicant_id |
| form_data | applicant_id | applicant_id |
| industry_data_example | applicant_id | applicant_id |

Table client

Column List

| Name | Code | Type | P | M |
|---|---|---|---|---|
| client_id | client_id | int | Yes | Yes |

Index List

| Index Code | P | F | A | U | C | Column Code | Sort |
|---|---|---|---|---|---|---|---|
| PK_CLIENT | Yes | No | No | Yes | Yes | client_id | ASC |

Reference by List

| Referenced by | Primary Key | Foreign Key |
|---|---|---|
| client_subscription | client_id | client_id |
| applicant | client_id | client_id |

Table client_subscription

Column List

| Name | Code | Type | P | M |
|---|---|---|---|---|
| subject_area_id | subject_area_id | int | No | No |
| client_id | client_id | int | No | No |

Reference to List

| Primary Key | Reference to | Foreign Key |
|---|---|---|
| subject_area_id | subject_area | subject_area_id |
| client_id | client | client_id |

Table common_tags

Column List

| Name | Code | Type | P | M |
|---|---|---|---|---|
| tag_id | tag_id | int | Yes | Yes |
| industry_key | industry_key | int | No | Yes |
| description | description | char(40) | No | Yes |
| stored_length | stored_length | int | No | Yes |
| stored_data_type | stored_data_type | char(10) | No | Yes |
| column_name | column_name | char(30) | No | Yes |

-continued

Table common_tags

*Index List*

| Index Code | P | F | A | U | C | Column Code | Sort |
|---|---|---|---|---|---|---|---|
| PK_COMMON_TAGS | Yes | No | No | Yes | Yes | tag_id | ASC |

*Reference to List*

| Primary Key | Reference to | Foreign Key |
|---|---|---|
| industry_key | industry | industry_key |

*Reference by List*

| Referenced by | Primary Key | Foreign Key |
|---|---|---|
| form_tags | tag_id | tag_id |

Table concatinetion_

*Column List*

| Name | Code | Type | P | M |
|---|---|---|---|---|
| Database_tag_id | database_tag_id | int | Yes | Yes |
| Screen_tag_id | screen_tag_id | int | Yes | Yes |
| Style | style | int | No | Yes |
| Cat_order | cat_order | int | No | Yes |
| Separater | seperater | char(1) | No | Yes |
| Trailing_blanks | trailing_blanks | char(1) | No | Yes |
| Sub_field_location | sub_field_location | int | No | Yes |

*Index List*

| Index Code | P | F | A | U | C | Column Code | Sort |
|---|---|---|---|---|---|---|---|
| PK_CONCATINATION | Yes | No | No | Yes | Yes | database_tag_id | ASC |
|  |  |  |  |  |  | screen_tag_id | ASC |

*Reference to List*

| Primary Key | Reference to | Foreign Key |
|---|---|---|
| Form_tag_id | form_tags | database_tag_id |
| Form_tag_id | form_tags | screen_tag_id |

Table form

*Column List*

| Name | Code | Type | P | M |
|---|---|---|---|---|
| Form_id | form_id | int | Yes | Yes |
| Description | description | char(80) | No | Yes |
| Active_date | active_date | datetime | No | Yes |
| Inactive_date | inactive_date | datetime | No | Yes |
| Unedited_pdf | unedited_pdf | image | No | No |
| Table_generated | table_generated | char(1) | No | Yes |

*Index List*

| Index Code | P | F | A | U | C | Column Code | Sort |
|---|---|---|---|---|---|---|---|
| PK_FORM | Yes | No | No | Yes | Yes | form_id | ASC |

Table form

*Reference by List*

| Referenced by | Primary Key | Foreign Key |
|---|---|---|
| form_data | form_id | form_id |
| form_relationship | form_id | ancestor_form_id |
| form_relationship | form_id | decendant_form_id |
| form_tags | form_id | form_id |
| subject_area_form_list | form_id | form_id |

Table form_data

Column List

| Name | Code | Type | P | M |
|---|---|---|---|---|
| form_data_id | form_data_id | int | Yes | Yes |
| form_id | form_id | int | No | No |
| applicant_id | applicant_id | int | No | No |
| form_PDF | form_PDF | image | No | Yes |
| date_last_entered | date_last_entered | datetime | No | Yes |
| updateable | updateable | char(1) | No | Yes |
| version_number | version_number | smallint | No | Yes |

Index List

| Index Code | P | F | A | U | C | Column Code | Sort |
|---|---|---|---|---|---|---|---|
| PK_FORM_DATA | Yes | No | No | Yes | Yes | form_data_id | ASC |

Reference to List

| Primary Key | Reference to | Foreign Key |
|---|---|---|
| form_id | form | form_id |
| applicant_id | applicant | applicant_id |

Reference by List

| Referenced by | Primary Key | Foreign Key |
|---|---|---|
| industy_data_example2 | form_data_id | form_data_id |

Table form_relationship

Column List

| Name | Code | Type | P | M |
|---|---|---|---|---|
| ancestor_form_id | ancestor_form_id | int | Yes | Yes |
| decendant_form_id | decendant_form_id | int | Yes | Yes |
| form_level | form_level | int | No | Yes |
| form_order | form_order | int | No | Yes |

Index List

| Index Code | P | F | A | U | C | Column Code | Sort |
|---|---|---|---|---|---|---|---|
| PK_FORM_RELATIONSHIP | Yes | No | No | Yes | Yes | ancestor_form_id | ASC |
| | | | | | | decendant_form_id | ASC |

Reference to List

| Primary Key | Reference to | Foreign Key |
|---|---|---|
| form_id | form | ancestor_form_id |
| form_id | form | decendant_form_id |

Table form_specific_data_ex

Column List

| Name | Code | Type | P | M |
|---|---|---|---|---|
| industry_data_id | industry_data_id | int | Yes | Yes |
| form_data_id | form_data_id | int | No | Yes |
| applicant_id | applicant_id | int | No | Yes |
| date_entered | date_entered | datetime | No | No |
| name_long | name_long | char(43) | No | No |
| first_name | first_name | char(20) | No | No |

-continued

Table form_specific_data_ex

| last_name | last_name | char(20) | No | No |
| middle_initial | middle_initial | char(1) | No | No |
| ssn | ssn | char(10) | No | No |
| birthdate | birthdate | datetime | No | No |
| mothers_maden_name | mothers_maden_name | char(20) | No | No |
| address1 | address1 | char(40) | No | No |
| address2 | address2 | char(40) | No | No |
| city | city | char(20) | No | No |
| state_provence | state_provence | char(3) | No | No |
| postal_code | postal_code | char(10) | No | No |
| form_question1 | form_question1 | char(80) | No | No |
| form_question2 | form_question2 | char(80) | No | No |
| form_question3 | form_question3 | char(80) | No | No |

Index List

| Index Code | P | F | A | U | C | Column Code | Sort |
|---|---|---|---|---|---|---|---|
| PK_INDUSTRY_DATA2 | Yes | No | No | Yes | Yes | industry_data_id | ASC |

Reference to List

| Primary Key | Reference to | Foreign Key |
|---|---|---|
| form_data_id | form_data | form_data_id |
| applicant_id | applicant | applicant_id |

Table form_tags

Column List

| Name | Code | Type | P | M |
|---|---|---|---|---|
| form_tag_id | form_tag_id | int | Yes | Yes |
| form_id | form_id | int | No | Yes |
| tag_id | tag_id | int | No | No |
| actual_form_text | actual_form_text | char(60) | No | Yes |
| description | description | char(80) | No | Yes |
| validation_script | validation_script | char(40) | No | Yes |
| tag_name | tag_name | char(40) | No | Yes |
| tag_data_type | tag_data_type | char(3) | No | Yes |
| required_flag | required_flag | char(1) | No | Yes |
| concatinated_flag | concatinated_flag | char(1) | No | Yes |
| form_tag_type | form_tag_type | char(8) | No | No |
| checked_flag | checked_flag | char(1) | No | No |
| form_tag_align | form_tag_align | char(8) | No | No |
| maxlength | maxlength | int | No | No |
| size | size | int | No | No |

Index List

| Index Code | P | F | A | U | C | Column Code | Sort |
|---|---|---|---|---|---|---|---|
| PK_FORM_TAGS | Yes | No | No | Yes | Yes | form_tag_id | ASC |

Reference to List

| Primary Key | Reference to | Foreign Key |
|---|---|---|
| form_id | form | form_id |
| tag_id | common_tags | tag_id |

Reference by List

| Referenced by | Primary Key | Foreign Key |
|---|---|---|
| concatinetion | form_tag_id | database_tag_id |
| concatinetion | form_tag_id | screen_tag_id |
| form_tags_radio | form_tag_id | form_tag_id |

Table form_tags_radio

Column List

| Name | Code | Type | P | M |
|---|---|---|---|---|
| form_tag_id | form_tag_id | int | Yes | Yes |
| form_radio_id | form_radio_id | int | Yes | Yes |
| db_value | db_value | char(20) | No | Yes |
| act_radio_text | act_radio_text | char(20) | No | Yes |

Index List

| Index Code | P | F | A | U | C | Column Code | Sort |
|---|---|---|---|---|---|---|---|
| form_tags_7680057671 | Yes | No | No | Yes | Yes | form_tag_id | ASC |
|  |  |  |  |  |  | form_radio_id | ASC |

Reference to List

| Primary Key | Reference to | Foreign Key |
|---|---|---|
| form_tag_id | form_tags | form_tag_id |

Table industry

Column List

| Name | Code | Type | P | M |
|---|---|---|---|---|
| industry_key | industry_key | int | Yes | Yes |
| name | name | char(40) | No | Yes |
| description | description | char(255) | No | Yes |
| table_creation | table_creation | char(1) | No | Yes |
| table_name | table_name | char(60) | No | Yes |
| table_created | table_created | char(1) | No | Yes |

Index List

| Index Code | P | F | A | U | C | Column Code | Sort |
|---|---|---|---|---|---|---|---|
| PK_INDUSTRY | Yes | No | No | Yes | Yes | industry_key | ASC |

Reference by List

| Referenced by | Primary Key | Foreign Key |
|---|---|---|
| common_tags | industry_key | industry_key |

Table industry_data_example

Column List

| Name | Code | Type | P | M |
|---|---|---|---|---|
| industry_data_id | industry_data_id | int | Yes | Yes |
| applicant_id | applicant_id | int | No | Yes |
| date_entered | date_entered | datetime | No | No |
| name_long | name_long | char(43) | No | No |
| first_name | first_name | char(20) | No | No |
| last_name | last_name | char(20) | No | No |
| middle_initial | middle_initial | char(1) | No | No |
| ssn | ssn | char(10) | No | No |
| birthdate | birthdate | datetime | No | No |
| mothers_maden_name | mothers_maden_name | char(20) | No | No |
| address1 | address1 | char(40) | No | No |
| address2 | address2 | char(40) | No | No |
| city | city | char(20) | No | No |
| state_provence | state_provence | char(3) | No | No |
| postal_code | postal_code | char(10) | No | No |

-continued

Table industry_data_example

Index List

| Index Code | P | F | A | U | C | Column Code | Sort |
|---|---|---|---|---|---|---|---|
| PK_INDUSTRY_DATA | Yes | No | No | Yes | Yes | industry_data_id | ASC |

Reference to List

| Primary Key | Reference to | Foreign Key |
|---|---|---|
| applicant_id | applicant | applicant_id |

Table subject_area

Column List

| Name | Code | Type | P | M |
|---|---|---|---|---|
| subject_area_id | subject_area_id | int | Yes | Yes |
| name | name | char(40) | No | Yes |
| description | description | char(255) | No | Yes |
| effective_date | effective_date | T_date | No | Yes |

Index List

| Index Code | P | F | A | U | C | Column Code | Sort |
|---|---|---|---|---|---|---|---|
| PK_SUBJECT_AREA | Yes | No | No | Yes | Yes | subject_area_id | ASC |

Reference by List

| Referenced by | Primary Key | Foreign Key |
|---|---|---|
| client_subscription | subject_area_id | subject_area_id |
| subject_area_form_list | subject_area_id | subject_area_id |

Table subject_area_form_list

Column List

| Name | Code | Type | P | M |
|---|---|---|---|---|
| subject_area_id | subject_area_id | int | Yes | Yes |
| form_id | form_id | int | Yes | Yes |
| form_order | form_order | int | No | Yes |
| mandatory | mandatory | char(1) | No | Yes |
| repeatable | repeatable | int | No | Yes |

Index List

| Index Code | P | F | A | U | C | Column Code | Sort |
|---|---|---|---|---|---|---|---|
| PK_SUBJECT_AREA_FORM_LIST | Yes | No | No | Yes | Yes | subject_area_id | ASC |
| | | | | | | form_id | ASC |

Reference to List

| Primary Key | Reference to | Foreign Key |
|---|---|---|
| subject_area_id | subject_area | subject_area_id |
| form_id | form | form_id |

Figure 3:
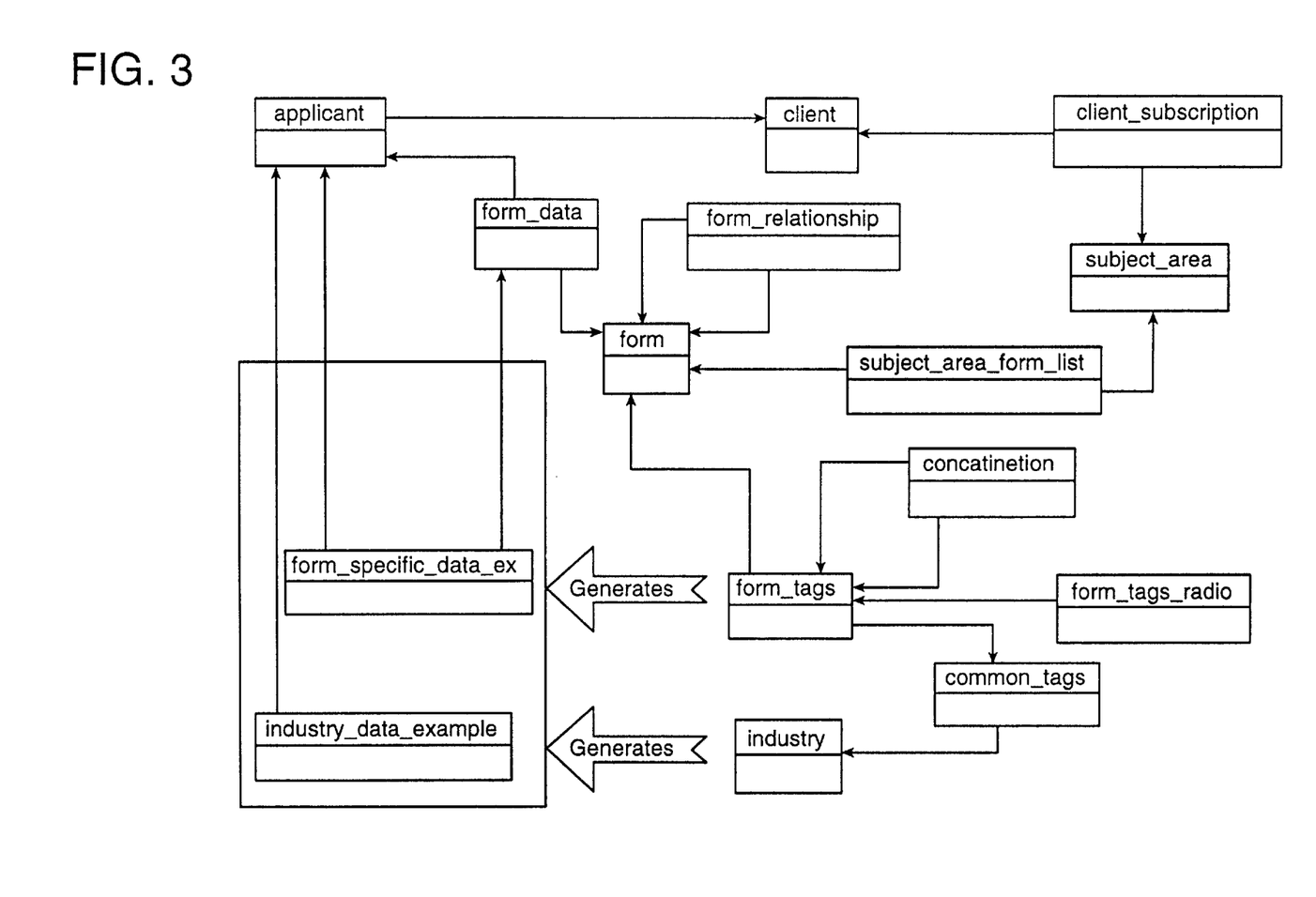
FIG. 3 is a diagram of the tables and relationships between them residing in the relational database.

The relationships between these tables are also shown in graphical form on FIG. 3.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the dependent claims.

That which is claimed:

1. A data processing system which allows multiple entities who do electronic commerce or other applications to enter their forms into the system and offer multiple users a convenient way of automatically entering information into the all data fields on many entities forms by the users completing the form once on a computer connected to a network comprising:

a database, a network, connecting said database to said network, an inputting means, said inputting means being connected to said network such that data input by an entity through said inputting means can be entered into said database, said data input being form identifying information and a form template containing data fields, a registration means, said registration means being capable of assigning said form identifying information a unique registration such that said form identifying information becomes uniquely registered form identifying information, storing said uniquely registered form identifying information in said database, said registration means being capable of assigning said form template a unique registration such that said form template becomes a uniquely registered form template, storing said uniquely registered form template in said database, a mapping means, said mapping means being capable of sorting said uniquely registered form identifying information into common group information, said common group information being stored in said database, a form field identification means, said form field identification means capable of parcing out and identifying said data fields on said form template creating uniquely identified form template data fields, storing said uniquely identified form template data fields in said database, a matching means, said matching means being capable of matching said uniquely identified form template data fields to said common group information such as to allow the matches to be verified by said entity using said data processing system, said uniquely identified form template data fields which are verifiably matched to said common group information becoming common form fields stored in said database, said uniquely identified form template data fields which are not verifiably matched to said common group information becoming unique form fields stored in said database, a second inputting means, said second inputting means being connected to said network such that form filling data input by a user through said second inputting means can be entered into said database, a separating means, said separating means capable of separating and tagging said form filling data into uniquely identified form filling data, storing said uniquely identified form filling data in said database, a form building means, said form building means retrieving said uniquely registered form identifying information, said uniquely registered form template, said common group information, said common form fields, said unique form fields, and said uniquely identified form filling data from said database a merging means, said merging means mapping said uniquely identified form filling data into said unique data fields and said common group information into said common form fields of said uniquely registered form template creating a completed form, a storage means wherein said completed form and said uniquely registered form identifying information can be stored for later retrieval, a sending means, said sending means connected to said network; and, said sending means forwarding said completed form and said uniquely registered form identifying information to said entity.

2. The data processing system of claim 1 wherein:

said uniquely identified stored form templates are in PDF format.

3. The data processing system of claim 1 wherein:

said uniquely identified stored form templates are in HTML format.

4. The data processing system of claim 1 wherein:

said inputting means is a web browser.

5. The data processing system of claim 1 wherein:

said second inputting means is a web browser.

6. The data processing system of claim 1 wherein:

said network is the Global Information Network.

7. The data processing system of claim 1 wherein:

said database is a relational database.

* * * * *